July 8, 1947.  R. L. BENSON  2,423,750
METHOD OF ASSEMBLING ELECTRIC MOTORS
Filed July 3, 1943  3 Sheets-Sheet 1

INVENTOR.
RALPH L. BENSON
BY
Carroll R. Faber

July 8, 1947.                    R. L. BENSON                    2,423,750
                      METHOD OF ASSEMBLING ELECTRIC MOTORS
                    Filed July 3, 1943            3 Sheets-Sheet 2
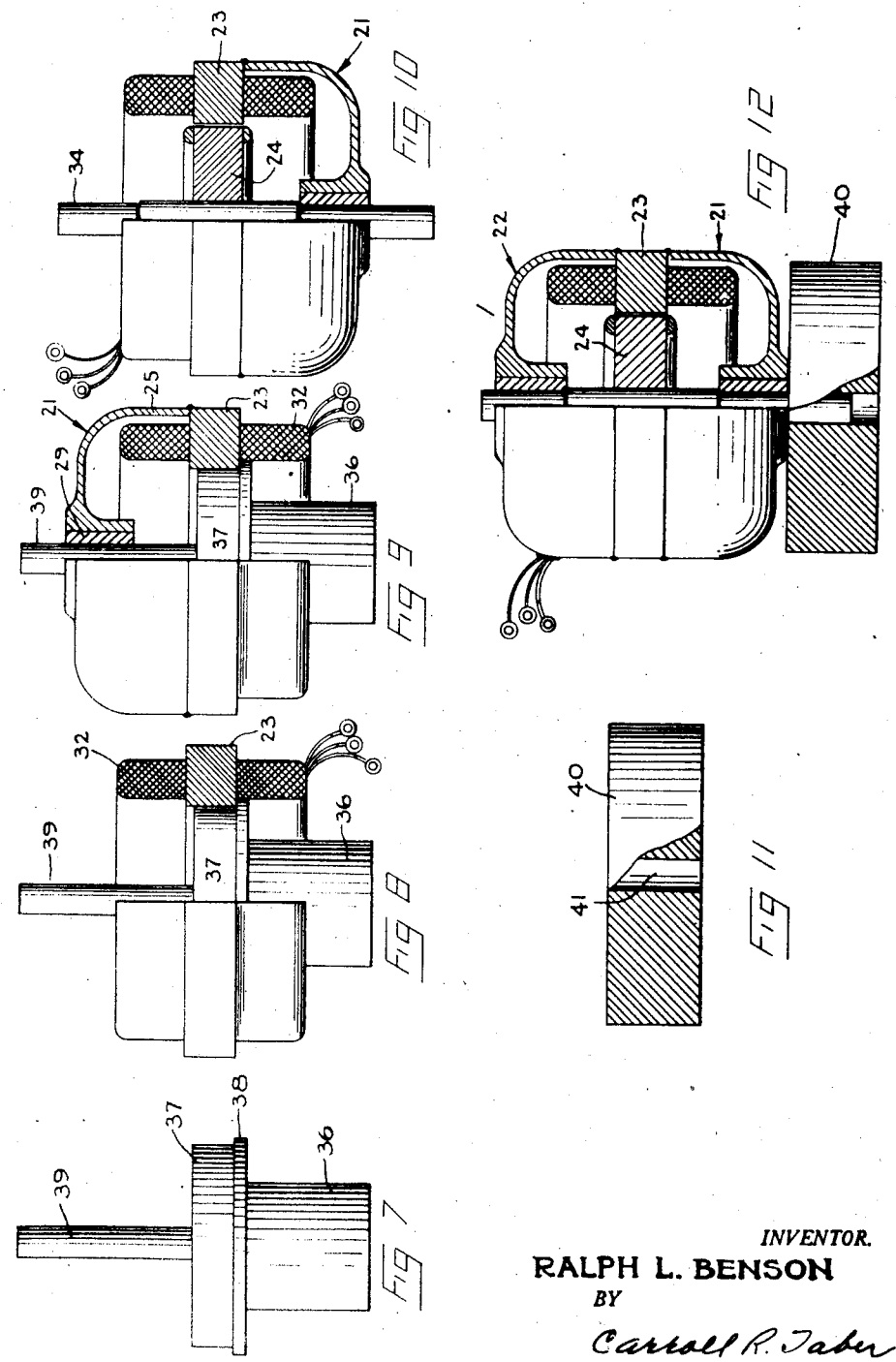
INVENTOR.
RALPH L. BENSON
BY
Carroll R. Faber July 8, 1947.  R. L. BENSON  2,423,750
METHOD OF ASSEMBLING ELECTRIC MOTORS
Filed July 3, 1943  3 Sheets-Sheet 3

INVENTOR.
RALPH L. BENSON
BY
Carroll R. Faber

Patented July 8, 1947

2,423,750

UNITED STATES PATENT OFFICE 2,423,750

METHOD OF ASSEMBLING ELECTRIC MOTORS

Ralph L. Benson, Greenville, Mich., assignor, by mesne assignments, to Gibson Refrigerator Company, Greenville, Mich., a corporation of Michigan Application July 3, 1943, Serial No. 493,359

4 Claims. (Cl. 29—155.5)

This invention relates to methods of making electric motors and more particularly to methods of assembling the end frame members and stator members thereof together.

This application is a continuation in part of my copending application for a Compressor motor, filed April 11, 1942, Serial No. 438,547.

Previous practices in the manufacture of motors, particularly those of the so-called fractional horsepower type, have necessitated holding a large number of dimensions within very close limits, ordinarily about .002 of an inch, or less. That has been necessary because of the manner in which the rotor, stator and journal bearing for the rotor shaft have been located with respect to each other. For instance, if the stator is bolted to the motor frame it is necessary to accurately machine the adjoining surfaces of the stator core and motor frame and to accurately locate the bolt holes in the stator core and motor frame so that the radially inner surface of the stator core will be concentric with the axis of the journal bearing and the rotor. On the other hand, if as is sometimes the case, the stator is press fitted into the frame, the inside of the frame must be accurately machined in coaxial relation with the journal bearing, and the outside of the stator core must be accurately machined to fit within the frame so as to be concentric with the radially inner surface of the stator core. All of this has been very costly, both from the standpoint of number and accuracy of operations employed in the mass production manufacture of motors, as well as the quantity of metal required in the frames.

It is desirable to minimize the quantity of metal employed in the rough castings or forgings from which the motor frame members are formed in order to reduce the cost thereof. It is extremely desirable also to eliminate as much as possible the machining of the motor frame members in order to reduce the waste incident to machining operations.

Accordingly, the principal object of this invention is to provide a novel method of making an electric motor which permits substantial simplification of the method of manufacture without less of accuracy of alignment of the rotor and stator.

Another object is to provide a method of making an electric motor which minimizes the amount of machining necessary in the finished motor.

A further object is to provide a method of making a motor by means of which the quantity of metal employed therein is minimized.

Other objects of the invention will appear in the following specification when read in connection with the accompanying drawings, wherein:

Figure 7 is an elevational view of a jig employed in the first assembly operation;

Figure 8 is an elevational view of the jig of Figure 7 with the stator in place thereon, the stator being shown partly in section;

Figure 9 is an elevational view of the jig of Figure 7 with the stator and one end frame member positioned therein;

Figure 10 is an elevational view partly in section of a sub-assembly comprising one end frame member, the stator and the true rotor in properly assembled relation;

Figure 11 is a partial cross-sectional view of a jig for use in the next assembly operation;

Figure 12 is an elevational view partly in section of the motor mounted on the jig of Figure 11 and the second end frame member assembled on the motor;

Figure 1:
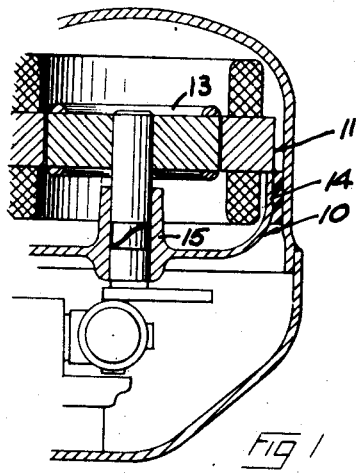
Figure 1 is a cross-sectional view of a compressor for an electric refrigerator employing a motor made by the method of the present invention.

Referring now to the drawings in more detail, Figure 1 discloses a compressor of a household refrigerator including an electric motor produced by the process to be presently described. The motor is shown on a larger scale in Figure 2. It comprises a single end frame member 10, a stator 11, and a rotor 13. Preferably the end frame member 10 is a one piece casting, although it may be a forging or a sheet metal stamping. As will be seen in Figure 2, the end frame member 10 is of generally dish-shaped configuration having an annular side wall 14 at its perimeter upon which the stator 11 is supported. In the center of the frame is a boss 15 provided with a bearing 16 for the rotor shaft. The bearing 16 may be of any suitable construction. It may be a cylindrical opening in the boss 15, or it may be an inserted bearing, preferably press fitted into an axially extending opening in the boss 15. The bearing 16 may be lubricated in any conventional manner.

The stator 11 comprises an annular core 17 of laminated metallic construction upon which the field and starting coils 18 are wound. Preferably the core 17 is formed from a number of leaves stamped from sheets of iron and suitably secured together. Preferably the stator core is arc welded to the end frame member 10, but it may be welded by any other welding process that does not injure the windings of the coils 18 by excessive heat.

The rotor comprises an armature 19 of somewhat less diameter than the interior diameter of the stator core 17 whereby to provide rotational clearance and a narrow air gap between the armature and stator core. A shaft 20 extends through the armature with the greater portion of the shaft extending from one end of the armature. The shaft is adapted to be received within the bearing 16.

Figure 2:
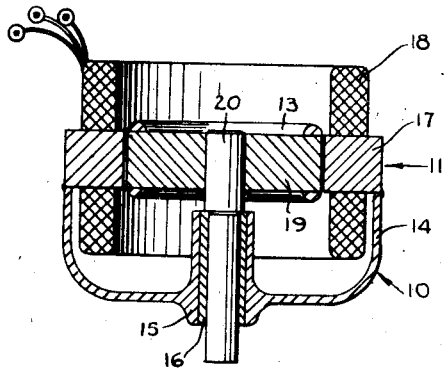
Figure 2 is a cross-sectional view of a motor employing but one end frame member.
Figure 3:
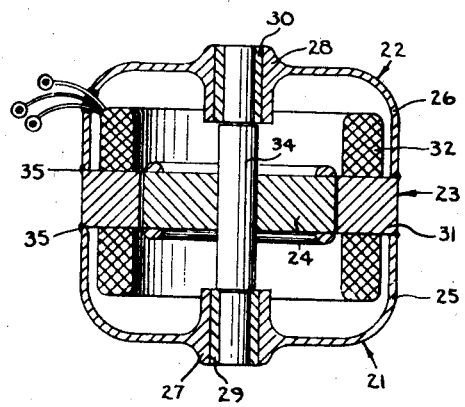
Figure 3 is a cross-sectional view of a modified form of motor employing two end frame members.
Figure 4:
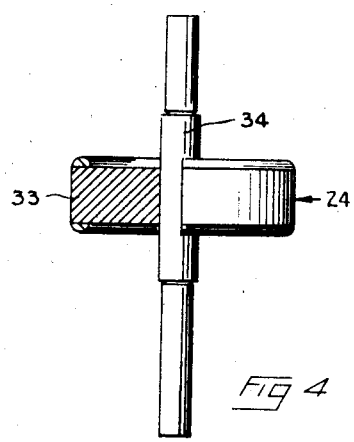
Figure 4 is a pictorial view of the rotor for the motor of Figure 3.
Figure 5:
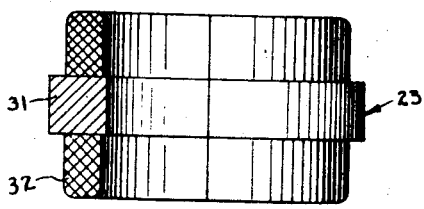
Figure 5 is an elevational view partly in section of a stator for the motor.
Figure 6:
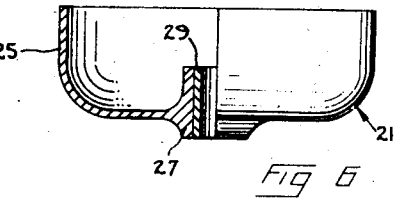
Figure 6 is an elevational view partly in section of one end frame member.

The motor shown in Figures 3 and 4 is generally similar to that disclosed in Figures 1 and 2 except that the motor is provided with two end frame members and the rotor shaft projects axially from both ends of the armature. This motor comprises a pair of frame members 21 and 22, a stator 23, and a rotor 24.

The end frame members 21 and 22 as shown are identical in order that they may be made in the same dies or by means of identical patterns. This is a further advantage of the present invention. It will be evident, however, as the disclosure of the invention proceeds that the primary features of the invention can be still realized even if the end frame members are not identical. It may be desirable to shape the end frame members differently. Both end frame members are provided with stator core attaching means at their perimeters which are shown as being annular side walls 25 and 26 respectively. Located centrally of the side walls 25 and 26 are bosses 27 and 28 respectively. In each boss is an axially extending opening to receive inserted bearings 29 and 30, although the walls that define the openings themselves may form the bearings.

The stator 23 is disclosed as being identical with stator 11 previously described. It consists of an annular laminated iron core 31 and field and starting coils 32 wound thereon. The exact construction of the stator is not particularly important. It may be of any suitable construction.

The rotor 24 consists of an armature 33 having a shaft projecting axially from both ends thereof. The ends of the shaft are journaled in the bearings 29 and 30 in the frame members 21 and 22 respectively.

The end frame members 21 and 22 are welded to the axially opposite extremities of the stator core 31 by arc welding the parts together in a plurality of spaced apart attaching zones about the perimeters thereof, as indicated at 35.

It will be noted from the foregoing description of the two motors that in each instance the stator core is mounted on the end frame member or members in such a way that before the parts are welded together the stator core is capable of limited movement radially and axially of the end frame members. Thus, the stator core can be adjusted to a position wherein it is coaxially aligned with the bearing or bearings to provide a uniform air gap between the stator core and the rotor. The stator core and rotor are adjusted to the proper position relative to each other as will be more fully pointed out hereinafter, and then secured together.

The method of making the motor of Figure 2 is the same as the initial steps of the process of making the motor shown in Figure 3. Hence, the description of the process of making the motor shown in Figure 3 will suffice to disclose the method of making the motor of Figure 2 also.

Briefly, the method of making the motors comprises providing the necessary end frames which are provided with centrally located bearings having accurate internal dimensions; locating the stator core adjacent the perimeter of the side wall of one frame in coaxial relationship with the bearing therein by suitable gauge means; welding the stator core to the frame; removing the gauge means; inserting one end of the rotor shaft in the last named bearing; positioning the other end frame over the other end of the shaft and thereby coaxially aligning the two bearings; and finally welding the last named end frame to the opposite end of the stator core.

The specific method employed in the production manufacture of this motor is disclosed in Figures 8 to 13. Figure 8 shows a jig for properly locating one end frame and the stator core in coaxial alignment. The jig comprises a base 36 adapted to be mounted upon any suitable support, such as a bench or table. On the upper end of the base 36 is a dummy rotor 37. The main portion of the dummy rotor 37 is of such an external diameter as to provide for a snug fit between the stator core and dummy rotor. At the lower end of the dummy rotor is a ledge 38 of slightly greater diameter than the internal diameter of the stator core 31. Projecting vertically from the dummy rotor and coaxially aligned therewith is a mandrel 39 adapted to fit snugly within the bearing 29 of the frame.

The core 31 of the stator is positioned over the dummy rotor 37 and is supported upon the ledge 38, as shown in Figure 9. The end frame 21 is then inverted and placed upon the jig with the mandrel 39 received in the bearing 29. Since the mandrel 39 and dummy rotor 37 are coaxially aligned and fit relatively snugly within the stator core 31 and bearing 29, it will be evident that the two last mentioned members must be coaxially aligned also when the parts are assembled on the jig. As pointed out above, the stator core can be moved relative to the frame to permit their coaxial alignment. Their relative position is shown in Figure 10. The frame and stator are then arc welded to each other at a plurality of points about their perimeters, preferably at about four points equi-distantly spaced. The welding can be done very rapidly and there is not enough heat generated to damage the field coil windings of the stator in any way. After welding core and frame the stator core is, of course, permanently located in exact coaxial relation with each other.

The sub-assembly consisting of the stator and one end frame 21 is then removed from the jig and inverted as shown in Figure 10. The true rotor 24 is inserted into the motor with one end of the shaft 34 located in the bearing 29. The last named end of the shaft 34 projects a considerable distance beyond the outer end of the bearing 29.

The foregoing steps of the process are all that are necessary for producing the motor of Figure 2. While the specific construction of the frame of the motor of Figure 2 differs somewhat from that of Figure 4, it will be readily apparent how assembly is effected.

Figure 12 shows a second jig 40 used in the next step of the process. The jig is simply a stand of any suitable material having a hole 41 extending vertically therethrough. The jig 40 is also mounted upon a bench.

Figure 13:
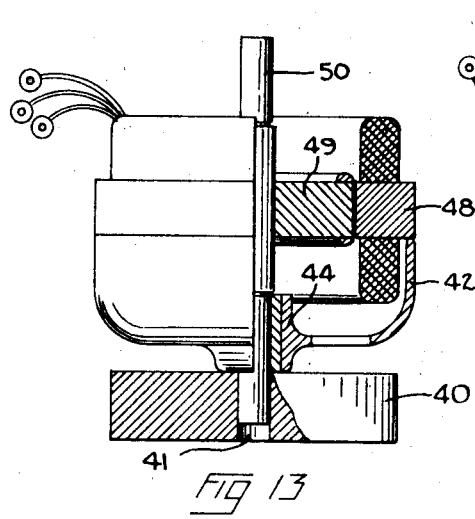
Figure 13 is an elevational view partly in section of a modified form of motor mounted on the jig of Figure 11.

The projecting end of the shaft 34 is placed in the hole 41 to support the sub-assembly shown in Figure 11. The other end frame 22 of the motor is dropped over the upper end of the shaft 34 with the latter received in the bearing 30, as shown in Figure 13. The shaft 34 is, of course, axially aligned with the bearing 29, and consequently, with the interior of the stator core 31. Hence, when the end frame 22 is positioned upon the other end of the shaft 34 the bearing 30 therein is coaxially aligned with the bearing 29 and stator core 31. The end frame 22 is arc welded to the upper extremity of the stator core 31 in the same manner as the frame 21 is attached to the stator core, thus serving to enclose the frame and provide another bearing for the last named end of the frame.

It is not essential, of course, that the method described above be followed in the exact manner defined. The jigs shown can be dispensed with but they facilitate and simplify the assembling of the various parts, particularly in rapid production of large numbers of motors of this type. The principal features of the entire process are the particular arrangement of the two end frame members and the stator core to permit limited axial and radial movement of the parts whereby to permit their accurate alignment, and a simple means for accomplishing the desired alignment.

According to the present invention, in order to effect proper alignment of the parts, the only surfaces which need to be held to close tolerances, by machining or otherwise, are the interior surfaces of the bearings 29 and 30 and the exterior surface of the shaft 34. Even if the axial extremities of the side walls of the end frame members 21 and 22 are not perfectly smooth and perpendicular to the axes of the bearings, as shown in the drawings, that is not important. The extremities of the walls may be quite rough because the jigs hold the parts in proper relationship to each other and the weld metal will fill up any inequalities between adjacent parts and form an integral union between them. While it is not necessary to hold the interior of the stator core to as close tolerances as the interior surfaces of the bearings 29 and 30 and the bearing surfaces of the shaft 34, the inner surface of the stator core must be dimensioned sufficiently accurately to provide a relatively uniform air gap between the stator and rotor and permit the latter to turn freely therein. Thus the stator core, preferably being laminated, may be somewhat rough.

Figure 14:
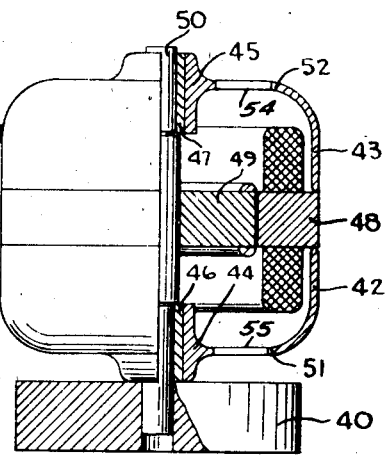
Figure 14 is a view similar to Figure 13 with the second end frame member in place thereon.
Figure 17:
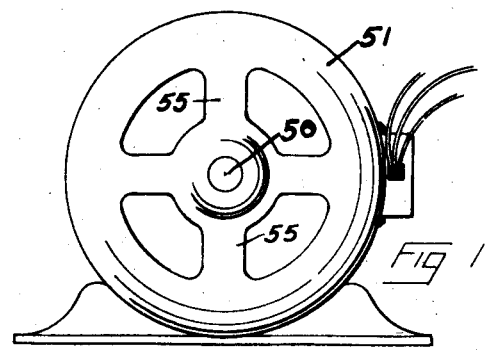
Figure 17 is an end elevational view of the motor shown in Figures 13 to 16.

Figures 14 and 17 disclose a slightly modified form of the motor and a somewhat different method of assembling the parts. The principal difference between the motor disclosed in these figures and the ones previously described is that the end frame members are in the form of spiders having relatively narrow struts spaced approximately 90 degrees apart. This construction leaves a number of openings in the end frame members and decreases the weight of the finished motor and the quantity of metal needed for their production. It permits the manufacture of the end frames by pressing them from sheet metal. Also, this construction lends itself to the particular method of assembly to be described presently. The motor may, of course, be made as in the previously described process.

The motor comprises two end frame members 51 and 52 similar to the members 21 and 22 shown in Figure 2 which are preferably identical, although they need not be. The end frame members comprise annular side walls 42 and 43, respectively, and cylindrical supports 44 and 45 receiving bearings 46 and 47 respectively. The side walls are joined to the respective supports by integral struts 54 and 55 which are spaced apart to provide openings therebetween.

Located between the end frame members 51 and 52 and welded thereto in coaxial relation to the bearings 46 and 47 is a stator 48. The latter is of the same construction as stator 23 previously described. A rotor 49 having a shaft 50 is rotatably journalled in the bearings 46 and 47.

Figure 15:
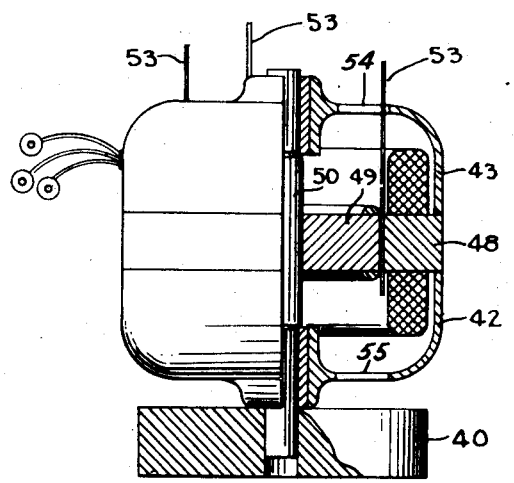
Figure 15 is a view similar to Figure 14 showing gauge means between the rotor and stator for positioning the parts in proper relationship to each other.
Figure 16:
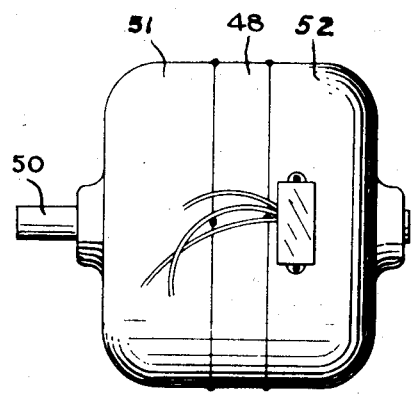
Figure 16 is a plan view of the completely assembled motor shown in Figures 13 to 15.

To assemble the motor the jig 40 shown in Figure 12 may be advantageously employed. One end frame member 51 is placed upon the jig in the manner shown in Figure 14. One end of the rotor shaft 50 is inserted in the bearing 46 in the frame member 51 and located in the hole 41 in the jig 40. The stator 48 is then dropped over the rotor until it rests upon the frame 51, as shown in Figure 14. The other end frame member 52 is then placed upon the stator with the upper end of the rotor shaft 50 received in the bearing 47 of frame member 52. At that stage the parts are positioned as shown in Figure 15. The two end frame members 51 and 52 are coaxially aligned with each other, but the stator is not necessarily in coaxial relationship with the two bearings. It will be observed that the stator core can be moved relative to the end frame members to bring it into coaxial alignment with the bearings and rotor shaft.

The stator 48 is brought into coaxial relationship with the bearings by inserting a plurality of spring steel shims 53 of the proper thickness through the openings in the upper end frame member 52 and into the space between the rotor 49 and the stator 48, the stator core being moved to permit insertion of the shims, as shown in Figure 15. At least three shims of the character shown must be used, although if arcuate shims of greater width are employed, only one or two will be necessary. With the parts thus held in place relative to each other, the two end frame members are arc welded to the stator at a plurality of points about their peripheries. This completes the motor as it is shown in Figure 17.

It will be apparent that in this modification of the invention the true rotor 49 forms a part of the gauge means for locating the stator relative to the frames.

From the foregoing it will be seen that the present invention provides a novel method of manufacturing electric motors which is a decided improvement over previous practices. A considerable quantity of metal is saved in the original castings because it is unnecessary to extend the side walls of the frame members about the exterior of the stator core. The principal feature, however, resides in the elimination of the necessity for machining or otherwise accurately forming the interior of the end frame members and the exterior of the stator core to close tolerances. The only true surfaces necessary are in the holes in the supports which receive the bearings.

The method lends itself readily to use in any type of production setup, such as an endless line.

The scope of the invention is indicated in the appended claims.

I claim:

1. The method of manufacturing motors which comprises providing a pair of end frame members having journal bearings therein with accurately dimensioned inner surface portions, providing a stator with an accurately dimensioned inner surface portion, positioning said parts with an external surface of the stator in juxtaposed relation to an external surface of each of said frame members, arranging and maintaining said parts with the annular inner surface of the stator in coaxial relation to said inner surface portions of the journal bearings solely by accurately dimensioned gauge means engaging said inner surface portions, and fixedly securing an external surface of said stator to an external surface of each of said frame members while said parts are held with said inner surface portions in said juxtaposed coaxial relation.

2. The method defined in claim 1 which comprises finally removing that portion of the gauge means that engages said inner surface portion of said stator.

3. The method of manufacturing motors which comprises providing a frame member having a journal bearing with an accurately dimensioned inner surface portion, providing a stator with an accurately dimensioned inner surface portion, positioning said parts with an external surface of said stator in juxtaposed relation to an external surface of the frame, arranging and maintaining said parts with said inner surface portion of the stator in coaxial relation to said inner surface portion of the journal bearing solely by accurately dimensioned gauge means engaging said inner surface portions, fixedly connecting an external surface of the stator to an external surface of the frame while holding said parts in said juxtaposed coaxial relation by said gauge means, providing a second end frame member having a journal bearing with an accurately dimensioned inner surface portion, positioning said last named end frame member with an external surface thereof in juxtaposed relation to an external surface of said stator, arranging and maintaining said accurately dimensioned journal bearing portions of the two frame members in coaxial relation solely by a rotor shaft located in both of said bearing portions, and finally fixedly connecting said last named frame member to said stator.

4. The method of manufacturing motors which consists of the following steps: providing a pair of end frame members, each having a journal bearing with an accurately dimensioned inner surface portion; providing a stator having an accurately dimensioned inner surface portion; providing a rotor having a central shaft projecting beyond the axially opposite ends of the rotor; positioning the stator and one of said end frames with an external surface of the stator juxtaposed to an external surface of said end frame; arranging and maintaining said parts with the said inner surface portion of the stator in coaxial relation to said inner surface portion of the journal bearing of said end frame member solely by accurately dimensioned gauge means engaging said inner surface portions; fixedly connecting an external surface of the stator to an external surface of said end frame member while holding said parts in said coaxial relation by said gauge means; thereafter removing the gauge means and positioning the rotor within the stator with one end of the rotor shaft received in the journal bearing of said end frame member; positioning said other end frame member with an external surface thereof in juxtaposed relation to an external surface of said stator and with the rotor shaft received in the journal bearing thereof; and finally fixedly securing an external surface of said last named end frame member to an external surface of the stator.

RALPH L. BENSON.

REFERENCES CITED

The following references are of record in the file of this patent:

UNITED STATES PATENTS

| Number | Name | Date |
|---|---|---|
| 1,317,335 | Tichenor | Sept. 30, 1919 |
| 1,527,162 | Alvord | Feb. 24, 1925 |
| 1,661,135 | Knight | Feb. 28, 1928 |
| 1,801,124 | Teichmann | Apr. 14, 1931 |
| 1,156,297 | Knight | Oct. 12, 1915 |
| 974,798 | Jacoby | Nov. 8, 1910 |
| 2,306,291 | Alons | Dec. 12, 1942 |

Certificate of Correction

Patent No. 2,423,750. July 8, 1947.

RALPH L. BENSON

It is hereby certified that error appears in the printed specification of the above numbered patent requiring correction as follows: Column 1, line 49, for "less" read *loss*; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.*